(12) United States Patent
Das et al.

(10) Patent No.: US 9,363,293 B2
(45) Date of Patent: Jun. 7, 2016

(54) IMAGE MONITORING FRAMEWORK

(71) Applicant: Bank of America Corporation, Charlotte, NC (US)

(72) Inventors: Tusnin Das, Hyderabad (IN); Kedarnath Shukla, Mumbai (IN); Pratibha Sharma, Gurgaon (IN)

(73) Assignee: Bank of America Corporation, Charlotte, NC (US)

( * ) Notice: Subject to any disclaimer, the term of this patent is extended or adjusted under 35 U.S.C. 154(b) by 28 days.

(21) Appl. No.: 14/474,442

(22) Filed: Sep. 2, 2014

(65) Prior Publication Data

US 2016/0065617 A1    Mar. 3, 2016

(51) Int. Cl.
*H04L 29/06* (2006.01)
*G06F 17/30* (2006.01)
*G06T 7/00* (2006.01)

(52) U.S. Cl.
CPC .......... *H04L 63/20* (2013.01); *G06F 17/30345* (2013.01); *G06T 7/0002* (2013.01); *G06T 2207/30108* (2013.01)

(58) Field of Classification Search
CPC ... H04L 63/20; G06F 17/30345; G06T 7/002; G06T 7/0002
USPC .......................................................... 726/1
See application file for complete search history.

(56) References Cited

U.S. PATENT DOCUMENTS

| | | | | |
|---|---|---|---|---|
| 7,324,140 B2* | 1/2008 | Kikuchi | ................ | H04N 5/772 348/231.7 |
| 8,199,965 B1* | 6/2012 | Basavapatna | ........... | H04L 51/12 382/100 |
| 8,234,496 B1* | 7/2012 | Ding | ....................... | G06F 21/16 713/161 |
| 8,341,734 B1* | 12/2012 | Hernacki | ............. | G06F 21/556 380/243 |
| 8,365,243 B1* | 1/2013 | Lu | ........................... | G06F 21/10 380/287 |
| 8,495,705 B1* | 7/2013 | Verma | .................... | G06Q 10/10 711/163 |
| 8,826,452 B1* | 9/2014 | He | .......................... | G06F 21/84 726/27 |
| 2010/0115614 A1* | 5/2010 | Barile | ................... | G06F 21/552 726/22 |
| 2014/0006350 A1* | 1/2014 | Fukui | ................ | G06F 17/30377 707/632 |
| 2014/0026182 A1* | 1/2014 | Pearl | ....................... | G06F 21/60 726/1 |

* cited by examiner

*Primary Examiner* — Michael S McNally
(74) *Attorney, Agent, or Firm* — Banner & Witcoff, Ltd.; Michael A. Springs (57) ABSTRACT

A computing platform may receive, from a network device, a message identifying data that was transmitted by a user device located in a private network associated with an organization. The network device may be located at a boundary between the private network and a public network. The data may include one or more images and may be destined for a network address associated with the public network. The computing platform may generate and store a record corresponding to the message. The computing platform may receive, from an analysis platform, data indicating whether the image(s) comprise content that violates a data leak prevention (DLP) policy of the organization. The computing platform may identify the record corresponding to the message and may update the record corresponding to the message to reflect whether the image(s) comprise content that violates the DLP policy of the organization.

20 Claims, 8 Drawing Sheets

IMAGE MONITORING FRAMEWORK

BACKGROUND

Many organizations maintain sensitive or proprietary data within their computing environments. For such organizations, it is often imperative that they prevent the unauthorized transmission of this sensitive or proprietary data from their computing environments. Digital images may contain sensitive or proprietary data. Accordingly, a need exists for an image monitoring framework.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a computing platform may receive, from a network device, a message identifying data that was transmitted by a user device located in a private network associated with an organization. The network device may be located at a boundary between the private network and a public network. The data may include one or more images and may be destined for a network address associated with the public network. The computing platform may generate and store a record corresponding to the message. The image(s) may be sent to an analysis platform. The computing platform may receive, from the analysis platform, data indicating whether the image(s) comprise content that violates a data leak prevention (DLP) policy of the organization. The computing platform may identify, from amongst a plurality of records corresponding to messages previously received from the network device, the record corresponding to the message. The computing platform may update the record corresponding to the message to reflect whether the image(s) comprise content that violates the DLP policy of the organization.

In some embodiments, the analysis platform may analyze the image(s) to determine whether the image(s) comprise content that violates the DLP policy of the organization. In such embodiments, the analysis platform may utilize optical character recognition (OCR) to identify text within the image(s), and may analyze the text within the image(s) to determine whether the image(s) comprise content that violates the DLP policy of the organization. Analyzing the text within the image(s) may include parsing the text to identify one or more text strings specified by the DLP policy of the organization and/or one or more patterns specified by the DLP policy of the organization. In some embodiments, the analysis platform may analyze one or more non-textual aspects of the image(s) to identify one or more non-textual aspects specified by the DLP policy of the organization.

In some embodiments, the data that was transmitted by the user device may comprise an email comprising the image(s). Additionally or alternatively, at least one of the image(s) may comprise a screen shot generated by the user device.

In some embodiments, the network device may receive the data that was transmitted by the user device, and may contemporaneously forward the data that was transmitted by the user device toward the network address. In other embodiments, the network device may receive the data that was transmitted by the user device, and may prevent the data that was transmitted by the user device from being forwarded toward the network address. In such embodiments, the computing platform may communicate, to the network device, an indication that the data that was transmitted by the user device does not violate the DLP policy of the organization, and the network device may forward the data that was transmitted by the user device toward the network address. Alternatively, the computing platform may communicate, to the network device, an indication that the data that was transmitted by the user device violates the DLP policy of the organization, and the network device may discard the data that was transmitted by the user device. In some embodiments, the network device may determine that the image(s) comprise content that has not been previously identified as complying with the DLP policy of the organization.

In some embodiments, the computing platform may determine, based on the data indicating whether the one or more images comprise content that violates the DLP policy of the organization, that the data that was transmitted by the user device violates the DLP policy of the organization. In such embodiments, responsive to determining that the data that was transmitted by the user device violates the DLP policy of the organization, the computing platform may generate a notification indicating that the data that was transmitted by the user device violates the DLP policy of the organization and may communicate the notification to the user device. Additionally or alternatively, responsive to determining that the data that was transmitted by the user device violates the DLP policy of the organization, the computing platform may identify one or more previous violations of the DLP policy of the organization that are associated with the user device. In such embodiments, the computing platform may determine, based on determining that the data that was transmitted by the user device violates the DLP policy of the organization and the one or more previous violations of the DLP policy of the organization that are associated with the user device, a number of violations, of the DLP policy of the organization, associated with the user device. In some embodiments, the computing platform may determine that the number of violations associated with the user device exceeds a threshold specified by the DLP policy of the organization. In such embodiments, responsive to determining that the number of violations associated with the user device exceeds the threshold specified by the DLP policy of the organization, the computing platform may generate a notification indicating that the number of violations associated with the user device exceeds the threshold specified by the DLP policy of the organization and may communicate the notification to a computing device associated with an administrator of the DLP policy of the organization.

In some embodiments, the computing platform may determine, based on the data indicating whether the image(s) comprise content that violates the DLP policy of the organization, that the image(s) comprise content that violates a threshold specified by the DLP policy of the organization. In such embodiments, responsive to determining that the image(s) comprise content that violates the threshold specified by the DLP policy of the organization, the computing platform may generate a notification indicating that the image(s) comprise content that violates the threshold specified by the DLP policy of the organization and may communicate the notification to a computing device associated with an administrator of the DLP policy of the organization.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
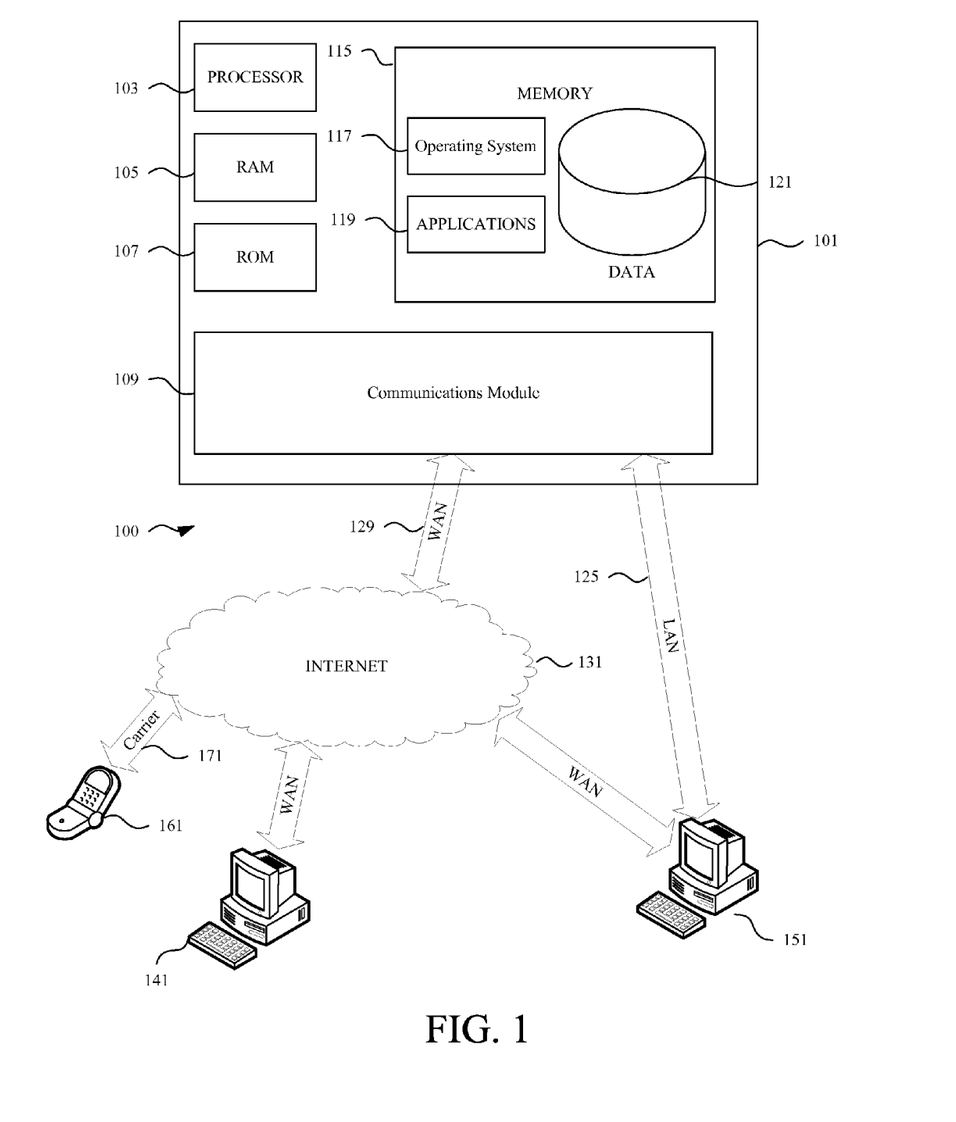
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
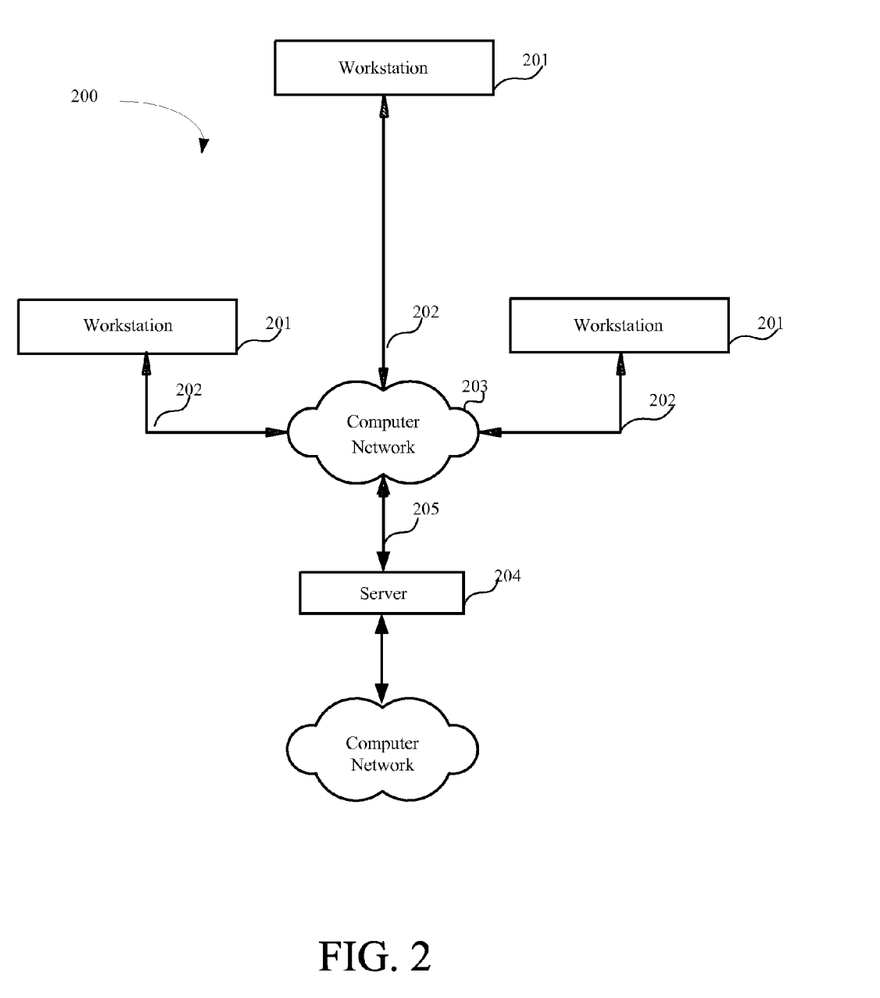
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
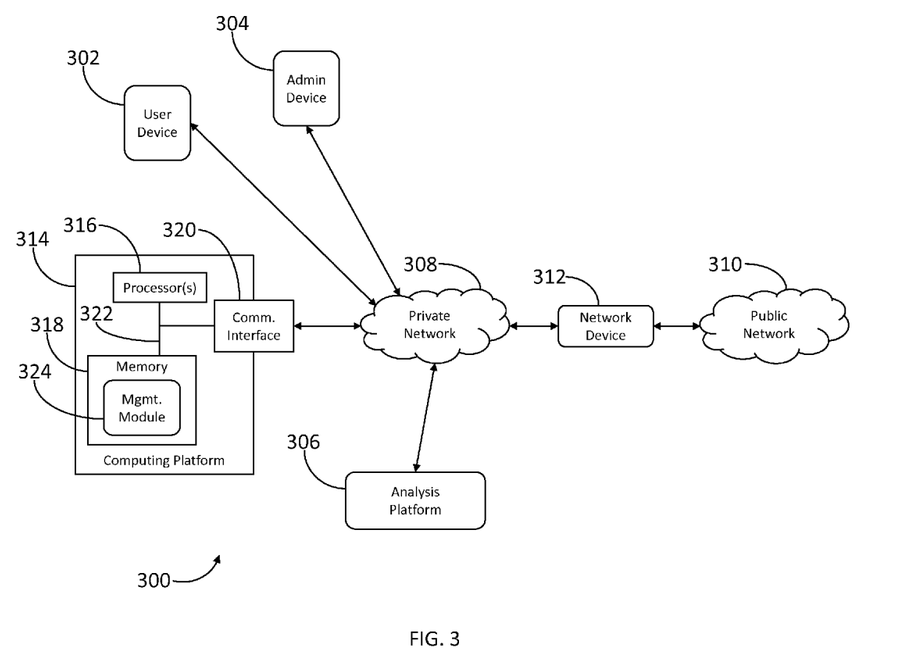
FIG. 3 depicts an illustrative computing environment for operating an image monitoring framework in accordance with one or more example embodiments.

FIG. 3 depicts an illustrative computing environment for operating an image monitoring framework in accordance with one or more example embodiments. Referring to FIG. 3, computing environment 300 may be associated with an organization (e.g., a corporation, university, government entity, financial institution, or the like) and may include one or more computing devices. For example, computing environment 300 may include user device 302, administrator device 304, and analysis platform 306. User device 302, administrator device 304, and/or analysis platform 306 may comprise one or more of any type of computing device (e.g., desktop computer, laptop computer, tablet computer, smart phone, server, server blade, mainframe, virtual machine, or the like). Computing environment 300 may also include one or more networks. For example, computing environment 300 may include private network 308 and public network 310. Private network 308 may be associated with the organization, may include one or more sub-networks (e.g., LANs, WANs, VPNs, or the like), and may interconnect one or more of user device 302, administrator device 304, and analysis platform 306. Public network 310 may be a network shared by the organization with other entities and/or may not be classified as a trusted network by the organization (e.g., the Internet).

Computing environment 300 may also include network device 312. Network device 312 may be located at a boundary between private network 308 and public network 310. For example, network device 312 may comprise a gateway, router, firewall, data leak prevention (DLP) device, deep packet inspection (DPI) device, or the like.

Computing environment 300 may also include one or more computing platforms. For example, computing environment 300 may include computing platform 314. Computing platform 314 may include one or more of any type of computing device (e.g., desktop computer, laptop computer, tablet computer, smart phone, server, server blade, mainframe, virtual machine, or the like) configured to perform one or more of the functions described herein. In some embodiments, computing platform 314 may include one or more of user device 302, administrator device 304, analysis platform 306, and/or network device 312. Computing platform 314 may include one or more processor(s) 316, memory 318, communication interface 320, and/or data bus 322. Data bus 322 may interconnect processor(s) 316, memory 318, and/or communication interface 320. Communication interface 320 may be a network interface configured to support communication between computing platform 314 and private network 308 (or one or more sub-networks thereof). Memory 318 may include one or more program modules comprising instructions that when executed by processor(s) 316 cause computing platform 314 to perform one or more functions described herein. For example, memory 318 may include management module 324, which may comprise instructions that when executed by processor(s) 316 cause computing platform 314 to perform one or more functions described herein.

Figure 4A:
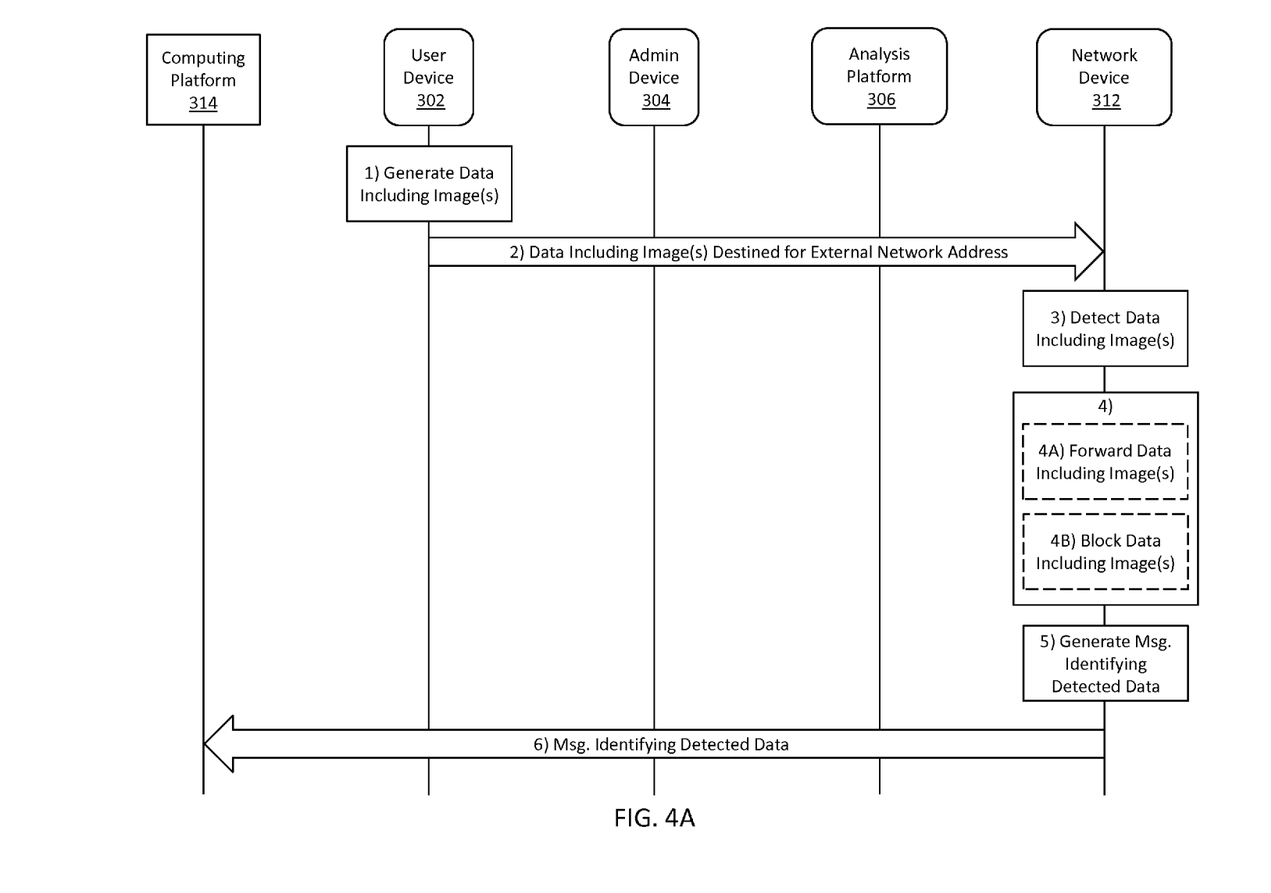
FIGS. 4A, 4B, 4C, and 4D depict an illustrative event sequence for operating an image monitoring framework in accordance with one or more example embodiments.

FIGS. 4A, 4B, 4C, and 4D depict an illustrative event sequence for operating an image monitoring framework in accordance with one or more example embodiments. Referring to FIG. 4A, at step 1, user device 302 may generate data comprising one or more images. For example, user device 302 may generate an email message, and the email message may comprise the image(s) (e.g., a screen shot generated by user device 302). At step 2, user device 302 may transmit (e.g., via private network 308) the data comprising the image(s) toward a network address associated with public network 310. For example, the email message may be addressed to a recipient address that is not associated with the organization. Network device 312 may receive the data transmitted by user device 302, and, at step 3, network device 312 may detect the data comprising the image(s). In some embodiments, network device 312 may determine that the image(s) comprise content that has not been previously identified as complying with a DLP policy of the organization. For example, network device 312 may be configured to recognize image(s) previously identified as complying with the DLP policy (e.g., image(s) frequently sent across the boundary, such as one or more logos associated with the organization, or the like). At step 4, network device 312 may either contemporaneously forward the data comprising the image(s) toward the network address (as depicted in step 4A) or prevent the data comprising the image(s) from being forwarded toward the network address (as depicted in step 4B).

Figure 4B:
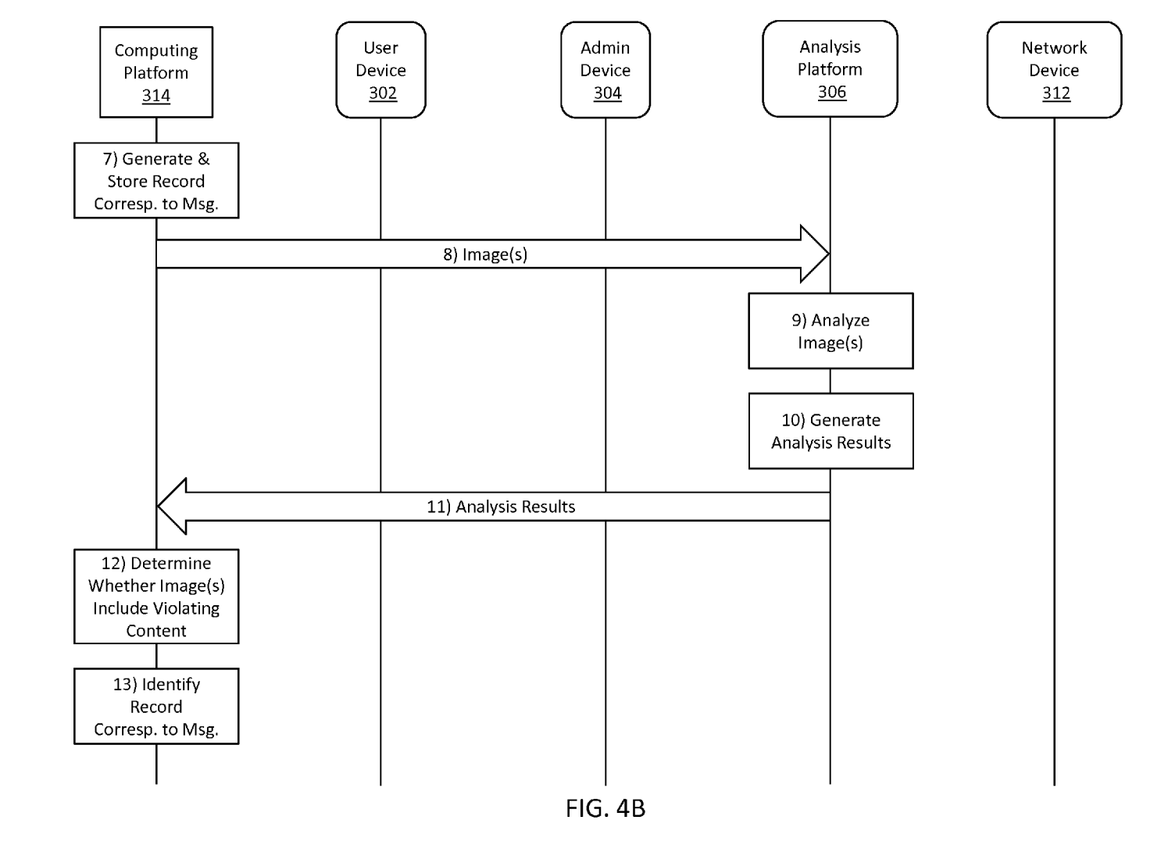

At step 5, network device 312 may generate a message identifying the data comprising the image(s), and, at step 6, network device 312 may communicate (e.g., via private network 308) the message identifying the data comprising the image(s) to computing platform 314. Referring to FIG. 4B, computing platform 314 may receive (e.g., via communication interface 320) the message identifying the data comprising the image(s), and, at step 7, computing platform 314 may generate a record corresponding to the message, and may store (e.g., in memory 318) the record corresponding to the message. In some embodiments, computing platform 314 may store the record corresponding to the message amongst a plurality of records that correspond to other messages received from network device 312 (e.g., records corresponding to other instances of network device 312 detecting data comprising image(s) and destined for network addresses associated with public network 310). At step 8, computing platform 314 may send (e.g., via communication interface 320 and private network 308) the image(s) to analysis platform 306. In some embodiments (not illustrated), the image(s) may be sent to analysis platform 306 by another computing device of computing environment 300 (e.g., network device 312).

Analysis platform 306 may receive the image(s), and, at step 9, analysis platform 306 may analyze the image(s) to determine whether the image(s) comprise content that violates the DLP policy. In some embodiments, analysis platform 306 may utilize optical character recognition (OCR) to identify text within the image(s). In such embodiments, analysis platform 306 may analyze the text within the image(s) to determine whether the image(s) comprise content that violates the DLP policy. For example, analysis platform 306 may parse the text to identify one or more text strings specified by the DLP policy (e.g., sensitive or proprietary data, such as customer names, account numbers, personal information, or the like) and/or one or more patterns specified by the DLP policy (e.g., using one or more regular expressions configured to identify sensitive or proprietary data based on its format, or the like). In some embodiments, analysis platform 306 may analyze one or more non-textual aspects of the image(s) to identify one or more non-textual aspects specified by the DLP policy (e.g., graphical user interface (GUI) elements indicative of sensitive or proprietary data, such as GUI elements of applications utilized by the organization that provide access to sensitive or proprietary data).

At step 10, analysis platform 306 may generate analysis results for the image(s). For example, analysis platform 306 may generate data indicating whether the image(s) comprise content that violates the DLP policy and/or an extent of the violation. At step 11, analysis platform 306 may communicate (e.g., via private network 308) the analysis results to computing platform 314. Computing platform 314 may receive (e.g., via communication interface 320) the analysis results, and, at step 12, may determine (e.g., based on the analysis results) whether the image(s) comprise content that violates the DLP policy. At step 13, computing platform 314 may identify (e.g., from amongst the plurality of records) the record corresponding to the message (e.g., the record generated and stored in step 7 above), and, referring to FIG. 4C, at step 14, may update the record corresponding to the message to reflect whether the image(s) comprise content that violates the DLP policy and/or the extent of the violation.

Figure 4C:
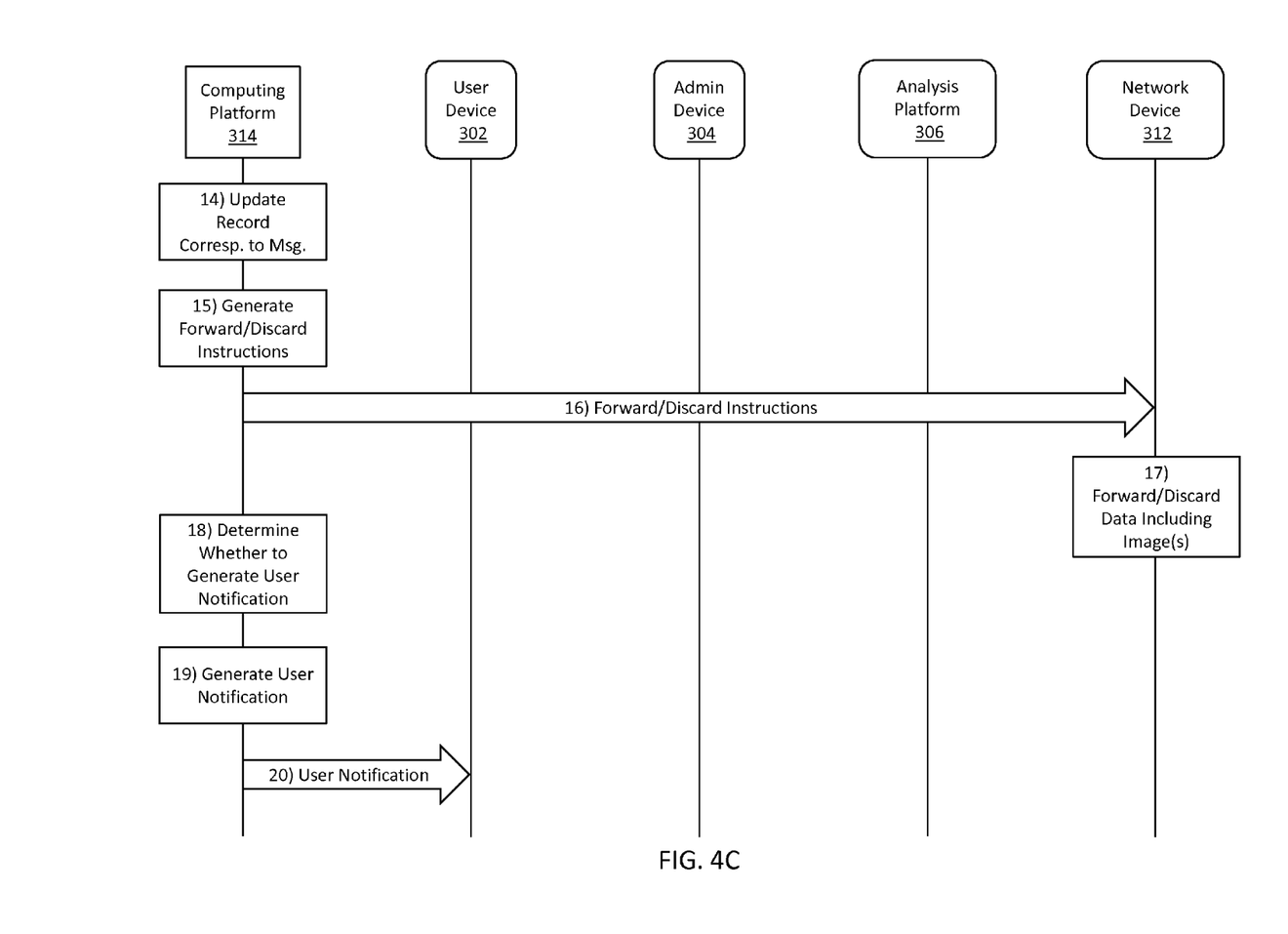

At step 15, computing platform 314 may generate, based on whether the image(s) comprise content that violates the DLP policy, instructions for network device 312 to either forward the data comprising the image(s) toward the network address or discard the data comprising the image(s) (e.g., in the event that network device 312 previously prevented the data comprising the image(s) from being forwarded toward the network address (as depicted in step 4B above)). For example, if the image(s) do not comprise content that violates the DLP policy, computing platform 314 may generate instructions for network device 312 to forward the data comprising the image(s) toward the network address. Alternatively, if the image(s) comprise content that violates the DLP policy, computing platform 314 may generate instructions for network device 312 to discard the data comprising the image(s). At step 16, computing platform 314 may communicate (e.g., via communication interface 320 and private network 308) the instructions to network device 312, which may receive the instructions and, at step 17, may, in accordance with the instructions, either forward the data comprising the image(s) toward the network address or discard the data comprising the image(s).

At step 18, computing platform 314 may determine whether to generate a user notification. For example, responsive to determining that the image(s) comprise content that violates the DLP policy (e.g., in step 12 above), computing platform 314 may determine to generate a user notification indicating that the data that was transmitted by user device 302 (e.g., the data comprising the image(s)) violates the DLP policy. At step 19, computing platform 314 may generate the user notification indicating that the data that was transmitted by user device 302 violates the DLP policy and, at step 20, may communicate (e.g., via communication interface 320 and private network 308) the user notification to user device 302.

Figure 4D:
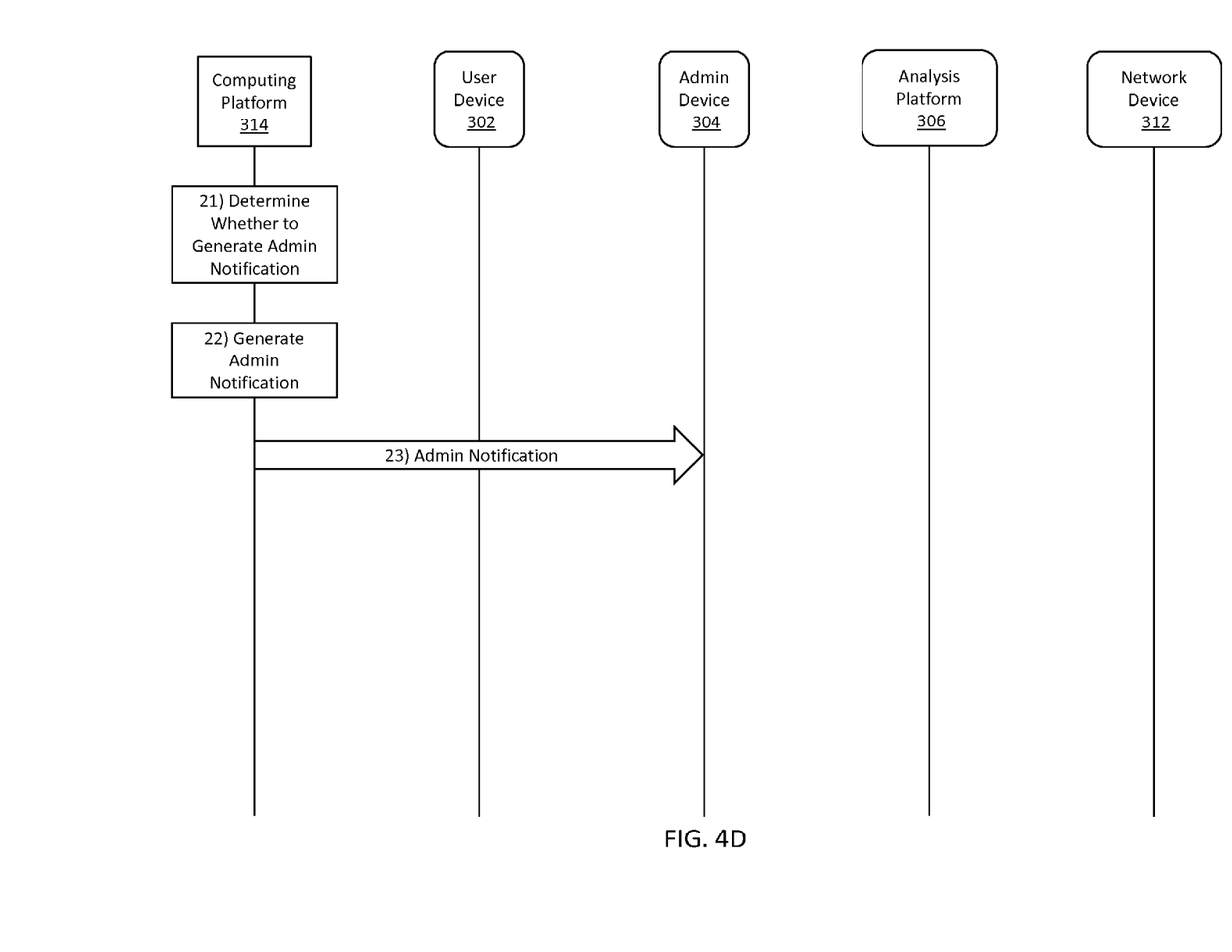

Referring to FIG. 4D, at step 21, computing platform 314 may determine whether to generate an admin notification. For example, in some embodiments, responsive to determining that the image(s) comprise content that violates the DLP policy (e.g., in step 12 above), computing platform 314 may identify one or more previous violations of the DLP policy that are associated with user device 302 (e.g., based on one or more of the plurality of records being associated with user device 302). In such embodiments, computing platform 314 may determine, based on determining that the image(s) comprise content that violates the DLP policy and the previous violation(s) of the DLP policy that are associated with user device 302, a number of violations, of the DLP policy, associated with user device 302 (e.g., a total number of violations (e.g., within a timeframe specified by the DLP policy) associated with user device 302 that includes the recently determined violation). In some embodiments, computing platform 314 may determine to generate an admin notification based on a determination that the number of violations associated with user device 302 exceeds a threshold specified by the DLP policy (e.g., constitutes an unacceptable number of violations (e.g., within the timeframe specified by the DLP policy)). Additionally or alternatively, computing platform 314 may determine (e.g. based on the extent of the violation) that the image(s) comprise content that violates a threshold specified by the DLP policy (e.g., that the extent of the recently determined violation constitutes an unacceptable violation), and computing platform 314 may determine to generate an admin notification based on the determination that the image(s) comprise content that violates the threshold specified by the DLP policy. Responsive to determining to generate an admin notification (e.g., based on the number of violations and/or the extent of the recently determined violation), at step 22, computing platform 314 may generate the admin notification (e.g., a notification indicating that the number of violations associated with user device 302 exceeds the threshold specified by the DLP policy and/or that the image(s) (e.g., the image(s) associated with the recently determined violation) comprise content that violates the threshold specified by the DLP policy) and, at step 23, may communication (e.g., via communication interface 320 and private network 308) the admin notification to administrator device 304, which may be associated with an administrator of the DLP policy (e.g., an information technology (IT) administrator of computing environment 300, a manager of a department associated with user device 302 that is tasked with enforcing the DLP policy for the department, or the like).

Figure 5:
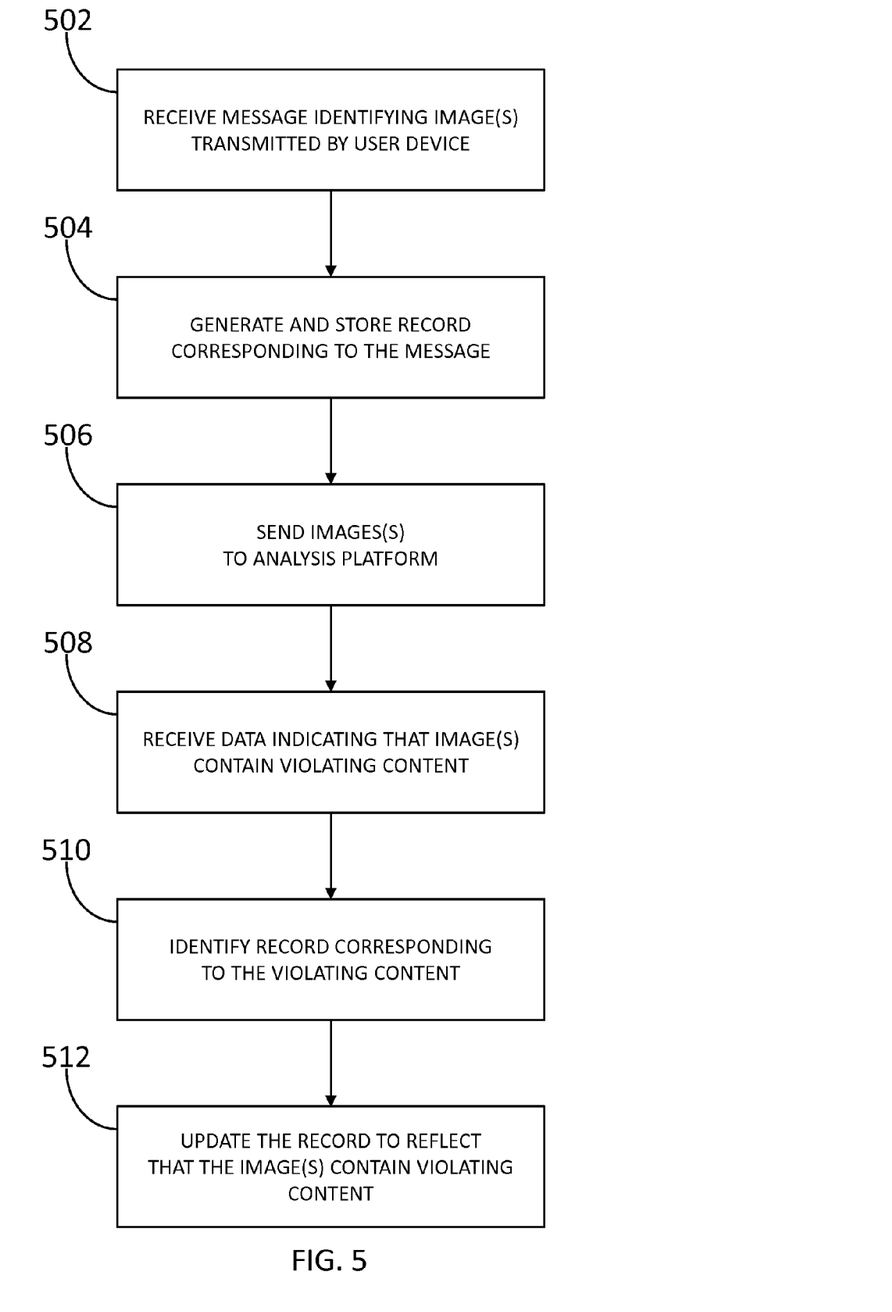
FIG. 5 depicts an illustrative method for operating an image monitoring framework in accordance with one or more example embodiments.

FIG. 5 depicts an illustrative method for operating an image monitoring framework in accordance with one or more example embodiments. Referring to FIG. 5, at step 502, a message identifying image(s) transmitted by a user device may be received. For example, computing platform 314 may receive, from network device 312, a message identifying image(s) transmitted by user device 302. At step 504, a record corresponding to the message may be generated and stored. For example, computing platform 314 may generate a record corresponding to the message identifying the image(s) transmitted by user device 302 and may store the record. At step 506, the image(s) may be sent to an analysis platform. For example, the image(s) transmitted by user device 302 may be sent (e.g., by computing platform 314 and/or network device 312) to analysis platform 306. At step 508, data indicating that the image(s) contain violating content may be received. For example, computing platform 314 may receive, from analysis platform 306, data indicating that the image(s) transmitted by user device 302 comprise violating content. At step 510, a record corresponding to the violating content may be identified. For example, computing platform 314 may identify the record corresponding to the message identifying the image(s) transmitted by user device 302. At step 512, the record may be updated to reflect that the image(s) contain violating content. For example, computing platform 314 may update the record corresponding to the message identifying the image(s) transmitted by user device 302 to reflect that the image(s) transmitted by user device 302 contain violating content.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
at a computing platform comprising at least one processor, a communication interface, and a memory:
receiving, via the communication interface and from a network device located at a boundary between a private network associated with an organization and a public network, a message identifying data that was transmitted by a user device located in the private network, destined for a network address associated with the public network, and included one or more images;
generating, by the at least one processor, a record corresponding to the message;
storing, by the at least one processor and in the memory, the record corresponding to the message;
sending, to an analysis platform, the one or more images;
receiving, via the communication interface and from the analysis platform, data indicating whether the one or more images comprise content that violates a data leak prevention (DLP) policy of the organization;
identifying, by the at least one processor and from amongst a plurality of records corresponding to messages previously received from the network device, the record corresponding to the message;
updating, by the at least one processor, the record corresponding to the message to reflect whether the one or more images comprise content that violates the DLP policy of the organization;
determining, by the at least one processor and based on the data indicating whether the one or more images comprise content that violates the DLP policy of the organization, that the data that was transmitted by the user device violates the DLP policy of the organization; and
responsive to determining that the data that was transmitted by the user device violates the DLP policy of the organization, identifying, by the at least one processor, one or more previous violations of the DLP policy of the organization that are associated with the user device.

2. The method of claim 1, comprising:
receiving, by the analysis platform, the one or more images; and
analyzing, by the analysis platform, the one or more images using optical character recognition (OCR) to identify text within the one or more images.

3. The method of claim 2, comprising analyzing, by the analysis platform, the text within the one or more images to determine whether the one or more images comprise content that violates the DLP policy of the organization.

4. The method of claim 3, wherein analyzing the text within the one or more images comprises parsing the text to identify one or more text strings specified by the DLP policy of the organization.

5. The method of claim 3, wherein analyzing the text within the one or more images comprises parsing the text to identify one or more patterns specified by the DLP policy of the organization.

6. The method of claim 1, comprising:
receiving, by the analysis platform, the one or more images; and
analyzing, by the analysis platform, one or more non-textual aspects of the one or more images to identify one or more non-textual aspects specified by the DLP policy of the organization.

7. The method of claim 1, comprising determining, by the network device, that the one or more images comprise content that has not been previously identified as complying with the DLP policy of the organization.

8. The method of claim 1, comprising:
receiving, by the network device, the data that was transmitted by the user device; and
preventing, by the network device, the data that was transmitted by the user device from being forwarded toward the network address.

9. The method of claim 8, comprising:
communicating, via the communication interface and to the network device, an indication that the data that was transmitted by the user device violates the DLP policy of the organization; and
responsive to receiving the indication, discarding, by the network device, the data that was transmitted by the user device.

10. The method of claim 1, comprising:
responsive to determining that the data that was transmitted by the user device violates the DLP policy of the organization:
generating, by the at least one processor, a notification indicating that the data that was transmitted by the user device violates the DLP policy of the organization; and
communicating, via the communication interface and to the user device, the notification indicating that the data that was transmitted by the user device violates the DLP policy of the organization.

11. The method of claim 1, comprising:
determining, by the at least one processor and based on determining that the data that was transmitted by the user device violates the DLP policy of the organization and the one or more previous violations of the DLP policy of the organization that are associated with the user device, a number of violations, of the DLP policy of the organization, associated with the user device;
determining, by the at least one processor, that the number of violations associated with the user device exceeds a threshold specified by the DLP policy of the organization; and
responsive to determining that the number of violations associated with the user device exceeds the threshold specified by the DLP policy of the organization:
generating, by the at least one processor, a notification indicating that the number of violations associated with the user device exceeds the threshold specified by the DLP policy of the organization; and
communicating, via the communication interface and to a computing device associated with an administrator of the DLP policy of the organization, the notification indicating that the number of violations associated with the user device exceeds the threshold specified by the DLP policy of the organization.

12. The method of claim 1, comprising:
determining, by the at least one processor and based on the data indicating whether the one or more images comprise content that violates the DLP policy of the organization, that the one or more images comprise content that violates a threshold specified by the DLP policy of the organization; and
responsive to determining that the one or more images comprise content that violates the threshold specified by the DLP policy of the organization:
generating, by the at least one processor, a notification indicating that the one or more images comprise content that violates the threshold specified by the DLP policy of the organization; and
communicating, via the communication interface and to a computing device associated with an administrator of the DLP policy of the organization, the notification indicating that the one or more images comprise content that violates the threshold specified by the DLP policy of the organization.

13. The method of claim 1, wherein the data that was transmitted by the user device comprises an email comprising the one or more images, and at least one of the one or more images comprises a screen shot generated by the user device.

14. A computing platform, comprising:
at least one processor;
a communication interface; and
memory storing instructions that, when executed by the at least one processor, cause the computing platform to:
receive, via the communication interface and from a network device located at a boundary between a private network associated with an organization and a public network, a message identifying data that was transmitted by a user device located in the private network, destined for a network address associated with the public network, and included one or more images;
generate, by the at least one processor, a record corresponding to the message;
store, by the at least one processor and in the memory, the record corresponding to the message;
send, to an analysis platform, the one or more images;
receive, via the communication interface and from the analysis platform, data indicating whether the one or more images comprise content that violates a data leak prevention (DLP) policy of the organization;
identify, by the at least one processor and from amongst a plurality of records corresponding to messages previously received from the network device, the record corresponding to the message;
update, by the at least one processor, the record corresponding to the message to reflect whether the one or more images comprise content that violates the DLP policy of the organization;
determine, by the at least one processor and based on the data indicating whether the one or more images comprise content that violates the DLP policy of the organization, that the data that was transmitted by the user device violates the DLP policy of the organization; and
responsive to determining that the data that was transmitted by the user device violates the DLP policy of the organization, identify, by the at least one processor, one or more previous violations of the DLP policy of the organization that are associated with the user device.

15. The computing platform of claim 14, wherein the memory stores additional instructions that, when executed by the at least one processor, cause the computing platform to:
responsive to determining that the data that was transmitted by the user device violates the DLP policy of the organization:
generate, by the at least one processor, a notification indicating that the data that was transmitted by the user device violates the DLP policy of the organization; and
communicate, via the communication interface and to the user device, the notification indicating that the data that was transmitted by the user device violates the DLP policy of the organization.

16. The computing platform of claim 14, wherein the memory stores additional instructions that, when executed by the at least one processor, cause the computing platform to:
determine, by the at least one processor and based on determining that the data that was transmitted by the user device violates the DLP policy of the organization and the one or more previous violations of the DLP policy of the organization that are associated with the user device, a number of violations, of the DLP policy of the organization, associated with the user device;
determine, by the at least one processor, that the number of violations associated with the user device exceeds a threshold specified by the DLP policy of the organization; and
responsive to determining that the number of violations associated with the user device exceeds the threshold specified by the DLP policy of the organization:
generate, by the at least one processor, a notification indicating that the number of violations associated with the user device exceeds the threshold specified by the DLP policy of the organization; and
communicate, via the communication interface and to a computing device associated with an administrator of the DLP policy of the organization, the notification indicating that the number of violations associated with the user device exceeds the threshold specified by the DLP policy of the organization.

17. The computing platform of claim 14, wherein the memory stores additional instructions that, when executed by the at least one processor, cause the computing platform to:
determine, by the at least one processor and based on the data indicating whether the one or more images comprise content that violates the DLP policy of the organization, that the one or more images comprise content that violates a threshold specified by the DLP policy of the organization; and
responsive to determining that the one or more images comprise content that violates the threshold specified by the DLP policy of the organization:
generate, by the at least one processor, a notification indicating that the one or more images comprise content that violates the threshold specified by the DLP policy of the organization; and
communicate, via the communication interface and to a computing device associated with an administrator of the DLP policy of the organization, the notification indicating that the one or more images comprise content that violates the threshold specified by the DLP policy of the organization.

18. The computing platform of claim 14, wherein the data that was transmitted by the user device comprises an email comprising the one or more images, and at least one of the one or more images comprises a screen shot generated by the user device.

19. One or more non-transitory computer-readable media having instructions stored thereon that when executed by a computing platform comprising at least one processor, a communication interface, and a memory, cause the computing platform to:
receive, via the communication interface and from a network device located at a boundary between a private network associated with an organization and a public network, a message identifying data that was transmitted by a user device located in the private network, destined for a network address associated with the public network, and included one or more images;
generate, by the at least one processor, a record corresponding to the message;
store, by the at least one processor and in the memory, the record corresponding to the message;
send, to an analysis platform, the one or more images;
receive, via the communication interface and from the analysis platform, data indicating whether the one or more images comprise content that violates a data leak prevention (DLP) policy of the organization;
identify, by the at least one processor and from amongst a plurality of records corresponding to messages previously received from the network device, the record corresponding to the message;
update, by the at least one processor, the record corresponding to the message to reflect whether the one or more images comprise content that violates the DLP policy of the organization;
determine, by the at least one processor and based on the data indicating whether the one or more images comprise content that violates the DLP policy of the organization, that the data that was transmitted by the user device violates the DLP policy of the organization; and
responsive to determining that the data that was transmitted by the user device violates the DLP policy of the organization, identify, by the at least one processor, one or more previous violations of the DLP policy of the organization that are associated with the user device.

20. The one or more non-transitory computer-readable media of claim 19, having additional instructions stored thereon that when executed by the computing platform, cause the computing platform to:
determine, by the at least one processor and based on determining that the data that was transmitted by the user device violates the DLP policy of the organization and the one or more previous violations of the DLP policy of the organization that are associated with the user device, a number of violations, of the DLP policy of the organization, associated with the user device;
determine, by the at least one processor, that the number of violations associated with the user device exceeds a threshold specified by the DLP policy of the organization; and
responsive to determining that the number of violations associated with the user device exceeds the threshold specified by the DLP policy of the organization:
generate, by the at least one processor, a notification indicating that the number of violations associated with the user device exceeds the threshold specified by the DLP policy of the organization; and communicate, via the communication interface and to a computing device associated with an administrator of the DLP policy of the organization, the notification indicating that the number of violations associated with the user device exceeds the threshold specified by the DLP policy of the organization.

\* \* \* \* \*